US007769767B2

(12) United States Patent
Petersen

(10) Patent No.: US 7,769,767 B2
(45) Date of Patent: Aug. 3, 2010

(54) SYSTEM AND METHOD FOR FILTERING CONTENT ON A MOBILE DEVICE BASED ON CONTEXTUAL TAGGING

(75) Inventor: Steven L. Petersen, Los Gatos, CA (US)

(73) Assignee: Domingo Enterprises, LLC, Wilmington, DE (US)

( * ) Notice: Subject to any disclaimer, the term of this patent is extended or adjusted under 35 U.S.C. 154(b) by 351 days.

(21) Appl. No.: 11/862,835

(22) Filed: Sep. 27, 2007

(65) Prior Publication Data
US 2009/0089288 A1 Apr. 2, 2009

(51) Int. Cl.
*G06F 7/00* (2006.01)
*G06F 17/30* (2006.01)
(52) U.S. Cl. ..................................... 707/754
(58) Field of Classification Search ........................ None
See application file for complete search history.

(56) References Cited

U.S. PATENT DOCUMENTS

| 6,801,909 | B2 | 10/2004 | Delgado et al. | |
|---|---|---|---|---|
| 2002/0052207 | A1 | 5/2002 | Hunzinger | |
| 2004/0123242 | A1* | 6/2004 | McKibben et al. | 715/513 |
| 2007/0044010 | A1 | 2/2007 | Sull et al. | |
| 2008/0040301 | A1* | 2/2008 | Sadagopan et al. | 706/16 |

FOREIGN PATENT DOCUMENTS

| WO | 2004/021613 A1 | 3/2004 |
|---|---|---|
| WO | 2005/104485 A1 | 11/2005 |
| WO | 2006/116240 A2 | 11/2006 |
| WO | 2006/137993 A2 | 12/2006 |
| WO | 2007/005187 A2 | 1/2007 |

OTHER PUBLICATIONS

"del.icio.us," http://del.icio.us/, printed Dec. 11, 2007, 3 pages.
"Apple— iPhone," http://www.apple.com/iphone/, printed Dec. 11, 2007, 2 pages.
"Apple—iPod classic," http://www.apple.com/ipodclassic/, printed Oct. 26, 2007, 1 page.
"Apple—iPod—iTunes," http://www.apple.com/itunes/, printed Feb. 7, 2007, 2 pages.
"Location Inter-operability Forum (LIF) Mobile Location Protocol, LIF TS 101 v2.0.0 Approved Specification," copyright Location Interoperability Forum LTD. 2001, 70 pages, available from www1.cs.columbia.edu/sip/drafts/LIF%20TS%20101%20v2.0.0.pdf.

* cited by examiner

*Primary Examiner*—Uyen T. Le
(74) *Attorney, Agent, or Firm*—Withrow & Terranova, PLLC

(57) ABSTRACT

A system and method of contextually filtering content presented to a user on a mobile device based on contextual tagging. The user controls how content will be filtered by the mobile device by creating contextual tags and associating or tagging content with the contextual tags. The contextual tag includes a contextual behavior that is either satisfied or not based on the current context of the mobile device. During operation, content accessible to the mobile device is searched to determine which contextual tags are met based on the current context of the mobile device. Content tagged with contextual tags whose behavior is currently met based on the current context of the mobile device are filtered and presented to the user. This allows the automatic presentation of a more manageable subgroup of content to the user on the mobile device based on the current context of the mobile device.

25 Claims, 12 Drawing Sheets

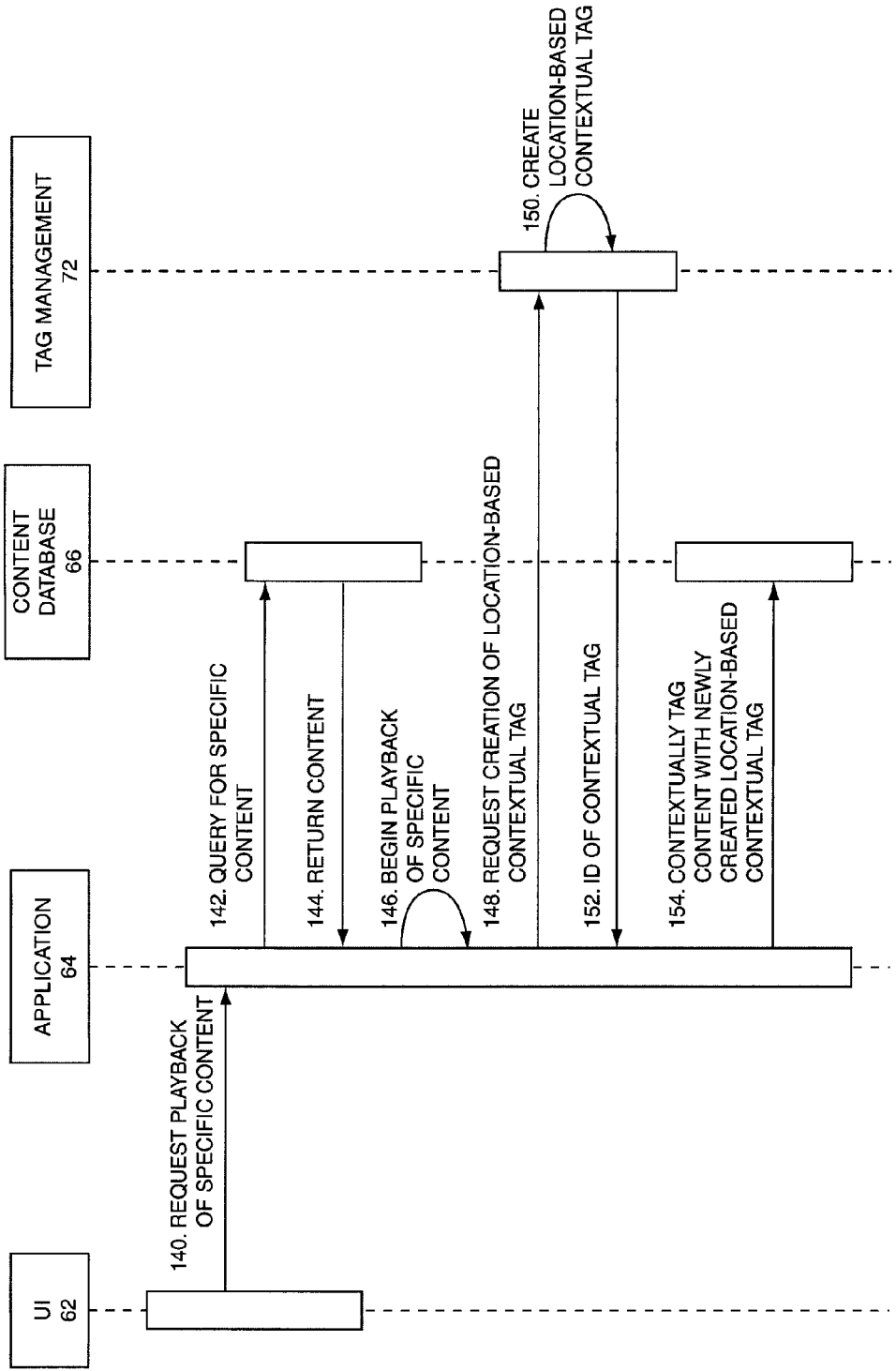

TAG TABLE (68)

| TAG | | BEHAVIOR | | | CHILD BEHAVIOR 1 (170) | |
|---|---|---|---|---|---|---|
| DATA TYPE (160) | NAME (162) | DATA TYPE (164) | INITIAL STATE (166) | RULES (168) | DATA TYPE | INITIAL STATE |
| TAG | FUNNY | (NONE) | | | | |
| TAG | CAMERON DIAZ | (NONE) | | | | |
| CONTEXTUAL TAG | LOCATION | BEHAVIOR | GPS COORDINATES OF LOCATION | CURRENT LOCATION IS WITHIN 500 FEET OF INITIAL LOCATION | (NONE) | |
| CONTEXTUAL TAG | SEASON | BEHAVIOR | DATE | CURRENT AND INITIAL DATES ARE IN MARCH, APRIL AND MAY (SPRING) OR CURRENT AND INITIAL DATES ARE IN JUNE, JULY AND AUGUST (SUMMER) OR CURRENT AND INITIAL DATES ARE IN SEPTEMBER, OCTOBER AND NOVEMBER (AUTUMN) OR CURRENT AND INITIAL DATES ARE IN DECEMBER, JANUARY AND FEBRUARY (WINTER) | | |
| CONTEXTUAL TAG | WORK | COMPOSITE BEHAVIOR | (NONE) | RULES (CHILD BEHAVIOR 1) AND RULES (CHILD BEHAVIOR 2) AND RULES (CHILD BEHAVIOR 3) | BEHAVIOR | GPS COORDINATES OF THE OFFICE |
| CONTEXTUAL TAG | DARK | BEHAVIOR | LIGHT SENSOR READING | CURRENT AND INITIAL LIGHT SENSOR READINGS ARE DARK | | |
| CONTEXTUAL TAG | DONOTDISTURB | COMPOSITE BEHAVIOR | (NONE) | RULES (CHILD BEHAVIOR 1) OR RULES (CHILD BEHAVIOR 2) | BEHAVIOR | MOBILE PHONE PROFILE SETTING |
| CONTEXTUAL TAG | FLYING | BEHAVIOR | ALTIMETER READING | CURRENT AND INITIAL ALTIMETER READING ARE ABOVE 10,000 FEET | | |

*FIG. 9A*

| RULES | CHILD BEHAVIOR 2 (172) | | | CHILD BEHAVIOR 3 (174) | | |
|---|---|---|---|---|---|---|
| | DATA TYPE | INITIAL STATE | RULES | DATA TYPE | INITIAL STATE | RULES |
| | (NONE) | | | (NONE) | | |
| | (NONE) | | | (NONE) | | |
| | (NONE) | | | (NONE) | | |
| CURRENT LOCATION IS WITHIN 500 FEET OF INITIAL LOCATION | BEHAVIOR | DAY OF WEEK | CURRENT DAY OF WEEK IS NOT SATURDAY OR SUNDAY | BEHAVIOR | TIME | CURRENT TIME IS BETWEEN 9AM AND 5 PM |
| CURRENT AND INITIAL MOBILE PHONE PROFILE SETTING ARE BOTH "SILENT" | BEHAVIOR | TIME | CURRENT AND INITIAL TIME ARE BETWEEN 10PM AND 6AM | | | |
| | | | | | | |

*FIG. 9B*

SYSTEM AND METHOD FOR FILTERING CONTENT ON A MOBILE DEVICE BASED ON CONTEXTUAL TAGGING

FIELD OF THE INVENTION

The present invention relates to a system and method of filtering content, including but not limited to multimedia content, on a mobile device based on contextual tagging. Content is filtered based on whether a current context of a "contextually aware" mobile device satisfies the contextual behavior defined in a contextual tag associated with the content.

BACKGROUND OF THE INVENTION

The development of small form factor, large memory capacity hard drives and other memory devices has facilitated growth of mobile devices for accessing and playing digital media. Mobile devices are particularly useful because they facilitate convenient "on-the-go" access of digital media for their users. Media content is stored in local memory in the mobile device for access by the user when desired. An example of such a mobile device is the Apple® iPOD® media player. The Apple® iPOD® media player provides gigabytes of memory storage. Media software applications, such as Apple® itunes® for example, are executed on a user's computer to store and manage the user's media library and facilitate downloading of desired media content to local memory in mobile devices.

Given the plethora of media content available, users may not have all desired media content stored on their mobile device. Thus, many mobile devices are increasingly being equipped with wireless communication capabilities. Wireless communications allow media devices to access media content not stored locally on the mobile device. Short-range wireless communication allows users to share media content with other users. Many manufacturers are also adding cellular communication capabilities to mobile devices so that media players can access media content over cellular networks from remote service providers. An example of such a mobile device is the Apple® iPhone®, which provides a combined cellular phone and media player into one mobile device.

Because of the plethora of media content available to users of mobile devices, both from locally stored and remotely accessed content, it is increasingly important to provide filtering capabilities. Without filtering, users may have to navigate through large and unmanageable media file listings to find desired media content. Filtering capabilities allow content to be provided to users in more manageable subgroups. To provide filtering, media content can be tagged with one or more static criterion that delineates the content in some manner. For example, if the media content are audio files, the audio files may include a genre tag. If an audio file is of a "Comedy" genre, the media item may be tagged with a "Comedy" genre tag in this example. Thus, if the user of the mobile device only wants to access audio files in the "Comedy" genre, the mobile device can consult the genre tag of the audio files to only provide those files having a "Comedy" genre tag.

One disadvantage of such filtering systems is that they use static-based criterion and are thus non-intelligent. The filtering criterion provided by the tag does not adapt to changes in the environment or context of the mobile device. For example, some media items tagged with a "Comedy" genre tag may be appropriate for some contexts such as home, but not for others such as a work place. Other media items may also be tagged with the "Comedy" genre tag, but may be appropriate for either home or work use. In such systems, media items tagged with "Comedy" genre tags would be filtered equally. Thus, the user may not be able to filter based on the presence of the "Comedy" genre tag effectively, because this filter may include media items that are both appropriate and inappropriate for a particular environment or context of the mobile device. If the mobile device could determine which "Comedy" media items were appropriate for which contexts on an individualized basis, the user could effectively use the "Comedy" genre filter without fear of a contextually inappropriate selection being made.

SUMMARY OF THE INVENTION

The present invention is a system and method of contextually filtering content presented to a user on a mobile device based on contextual tagging. The user controls how content will be filtered by the mobile device during operation by creating contextual tags and associating or tagging content with the contextual tags. The contextual tag includes a defined contextual behavior. The contextual behavior is an expression that is either satisfied or not based on the current context of the mobile device, a set of logical rules that apply to the current context and, an optional initial context. In this manner, the user controls the context that must exist for the mobile device in order for particular tagged content to be presented during operation. The user may use contextual tags to tag content deemed appropriate for certain contexts, but inappropriate for others. The mobile device is equipped to be "context aware." The mobile device may use a sensed context to define the initial context of a contextual tag when created as well as the current context of the mobile device during operation. The context of the mobile device can be any condition or surrounding able to be sensed by the mobile device, including the user's interaction with the mobile device that can change and can be sensed or determined.

During operation, after contextual tags have been created and assigned to content by the user, content is searched to determine which have contextual tags whose behavior is satisfied based on the current context of the mobile device. Content tagged with contextual tags whose contextual behaviors are satisfied are presented to the user. This means the particular content was previously designated by the user to be presented based on the current context of the mobile device. Content tagged with contextual tags whose contextual behaviors are not satisfied based on the current context of the mobile device are filtered and not presented to the user. In this manner, the present invention facilitates managing and automatically being presented with a more manageable subgroup of content on the mobile device based on the context of the mobile device from the user's perspective. This is opposed to solely filtering content based on static-based criterion that does not adapt or change based on the context of the mobile device.

For example, the contextual behavior defined by a contextual tag may be location based. A location-based contextual tag may include a contextual behavior defined as the mobile device being at or in close proximity to a specified location as the initial context. How close is decided by the user via a logical expression assigned to the contextual tag that defines the desired behavior. For example, the desired behavior assigned by the user may be that the mobile device must be located within ten miles of a work place for the contextual behavior to be satisfied. When the detected current location of the mobile device (i.e. the current context) indicates that the mobile device is located within ten miles of the work place in this example (i.e. the initial context), the behavior will be satisfied. The mobile device would then make any content tagged with this location-based contextual tag available to the user.

The user can establish and associate contextual tags having any desired behavior with the content. A contextual tag may include only one contextual behavior. Alternatively, a contextual tag may include more than one contextual behavior to include a composite contextual behavior. Contextual behavior included in contextual tags can be based on any contextual attribute(s) that can be sensed by the mobile device. As examples, the contextual attributes could include conditions such as the location of the mobile device, time of day, day of week, date, velocity, acceleration, direction of travel, weather, amount of sunlight, proximity of the mobile device to other users, state or data of applications running on the mobile device, or combinations thereof. For contextual attributes that require sensing of the mobile device's external environment or surroundings, one or more context sensors or other hardware components which may be associated with the mobile device may be used to determine the current context of the mobile device. In this manner, the mobile device is "context aware." Contextual behaviors can also be based on the context of the user and/or their interaction with the mobile device. For example, the user may establish contextual tags for "home" and "work" behaviors. Content assigned with a contextual tag associated with "home" behavior may not be appropriate for a "work" context, and vice versa.

The contextual tags may be established in data structures stored in association with the mobile device. These data structures may be implemented using object-oriented design (OOD) principles. OOD may be particularly well suited since it defines methods and attributes so as to associate behavior with data. For example, when a user desires to create a contextual tag, a tag factory object may be called upon to create a contextual tag object from a tag class. The tag factory may also be called upon to allow the user to create and associate one or more behavior objects with contextual tag objects. A contextual tag object does not contain any behavior evaluations. Instead, the one or more behavior objects associated with a contextual tag object are called upon. The behavior evaluations in the behavior objects are separated from the contextual tag objects to support decoupling, thus allowing easier reuse of behavior objects by other contextual tag objects. If the one or more contextual behavior objects associated with a contextual tag object are satisfied by the current context according to rules and state attributes in the behavior objects, the content tagged with the contextual tag will be made accessible by the mobile device to the user.

In an alternative embodiment, the mobile device may allow the user to manually force or override the current context even if the forced context does not naturally exist based on the current context of the mobile device. This allows a user to force the mobile device to filter content contextually based on the context desired by the user as opposed to the natural context sensed by the mobile device. For example, the user may want to access all content contextually tagged with a work location contextual tag, but when the user is on vacation. Instead of the user having to retag the content designated for a work context, the user can simply override the current context of the mobile device to force a work location context as the current context.

In another embodiment, the mobile device may be directed to implicitly contextually tag content without the user having to explicitly assign contextual tags. This allows the user to later recall content based on making a selection from previous contexts in which the user browsed and/or accessed content. For example, as a user accesses content in a normal fashion, the mobile device may automatically and silently in the background and unknown to the user contextually tag the content. If the user desires to later recall specific content, but the user can only remember the context in which the content was previously accessed, the user can review and select contextual tags assigned by the mobile device to recall content.

The mobile device employed by the present invention may be any type of mobile device, including but not limited to a cellular phone, a personal digital assistant (PDA), or a portable media player, as examples. The mobile device may or may not have communication capability. Communication capabilities may include either wired communication, wireless communication, or both. If the mobile device has communication capability, content and/or the context of the mobile device, which is used to determine if the contextual behavior of contextual tags for filtering are satisfied, both can be obtained from a remote system, such as a central content server for example.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 8 is a flow diagram illustrating an example of the mobile device implicitly creating a location-based contextual tag for content, according to one embodiment of the present invention;

FIGS. 9A and 9B illustrate an exemplary tag table containing examples of contextual tags created and associated with content, according to one embodiment of the present invention;

Figure 10:
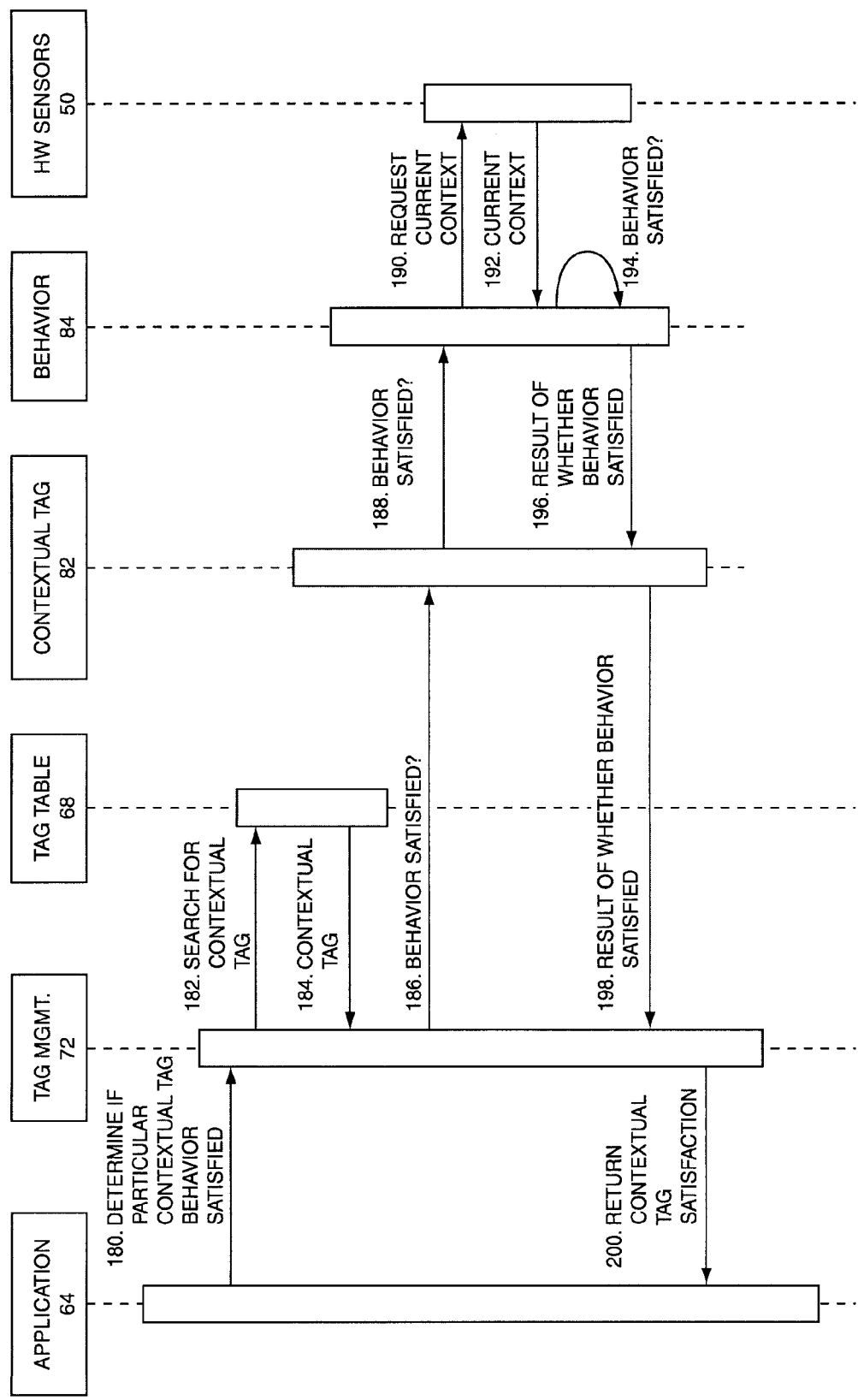
Figure 11:
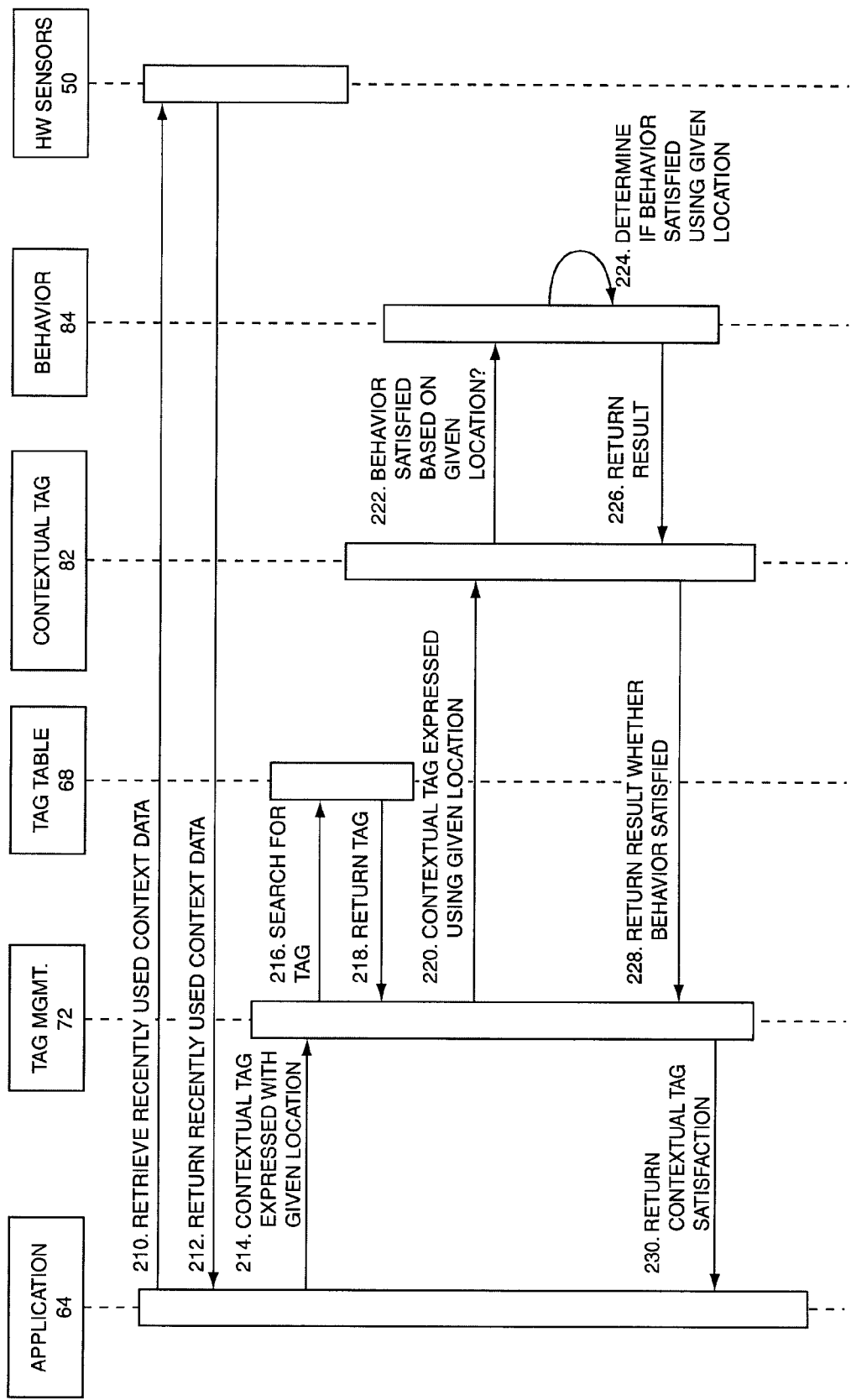

FIG. 10 is a flow diagram illustrating an example of evaluating a location-based contextual tag to determine if its location-based behavior is satisfied based on the current context location of the mobile device, according to one embodiment of the present invention; and FIG. 11 is a flow diagram illustrating an example of evaluating a location-based contextual tag to determine if its location-based behavior is satisfied using a hypothetical location provided by the user according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a system and method of contextually filtering content presented to a user on a mobile device based on contextual tagging. The user controls how content will be filtered by the mobile device during operation by creating contextual tags and associating or tagging content with the contextual tags. The contextual tag includes a defined contextual behavior. The contextual behavior is an expression that is either satisfied or not based on the current context of the mobile device, a set of logical rules that apply to the current context and, an optional initial context. In this manner, the user controls the context that must be present for the mobile device in order for particular tagged content to be presented during operation. The user may use contextual tags to tag content deemed appropriate for certain contexts, but inappropriate for others. The mobile device is equipped to be "context aware." The mobile device may use a sensed context to define the initial context of a contextual tag when created as well as the current context of the mobile device during operation. The context of the mobile device can be any condition or surrounding able to be sensed by the mobile device, including the user's interaction with the mobile device that can change and can be sensed or determined.

During operation, after contextual tags have been created and assigned to content by the user, content is searched to determine which have contextual tags whose behavior is satisfied based on the current context of the mobile device. Content tagged with contextual tags whose contextual behaviors are satisfied are presented to the user. This means the particular content was previously designated by the user to be presented based on the current context of the mobile device. Content tagged with contextual tags whose contextual behaviors are not satisfied based on the current context of the mobile device are filtered and not presented to the user. In this manner, the present invention facilitates managing and automatically being presented with a more manageable subgroup of content on the mobile device based on the context of the mobile device from the user's perspective. This is opposed to solely filtering content based on static-based criterion that does not adapt or change based on the context of the mobile device.

For example, the contextual behavior defined by a contextual tag may be location based. A location-based contextual tag may include a contextual behavior defined as the mobile device being at or in close proximity to a specified location as the initial context. How close is decided by the user via a logical expression assigned to the contextual tag that defines the desired behavior. For example, the desired behavior assigned by the user may be that the mobile device must be located within ten miles of a work place for the contextual behavior to be satisfied. When the detected current location of the mobile device (i.e. the current context) indicates that the mobile device is located within ten miles of the work place in this example (i.e. the initial context), the behavior will be satisfied. The mobile device would then make any content tagged with this location-based contextual tag available to the user.

The user can establish and associate contextual tags having any desired behavior with the content. A contextual tag may include only one contextual behavior. Alternatively, a contextual tag may include more than one contextual behavior to include a composite contextual behavior. Contextual behavior included in contextual tags can be based on any contextual attribute(s) that can be sensed by the mobile device. As examples, the contextual attributes could include conditions such as the location of the mobile device, time of day, day of week, date, velocity, acceleration, direction of travel, weather, amount of sunlight, proximity of the mobile device to other users, state or data of applications running on the mobile device, or combinations thereof. For contextual attributes that require sensing of the mobile device's external environment or surroundings, one or more context sensors or other hardware components which may be associated with the mobile device may be used to determine the current context of the mobile device. In this manner, the mobile device is "context aware." Contextual behaviors can also be based on the context of the user and/or their interaction with the mobile device. For example, the user may establish contextual tags for "home" and "work" behaviors. Content assigned with a contextual tag associated with "home" behavior may not be appropriate for a "work" context, and vice versa.

Figure 1:
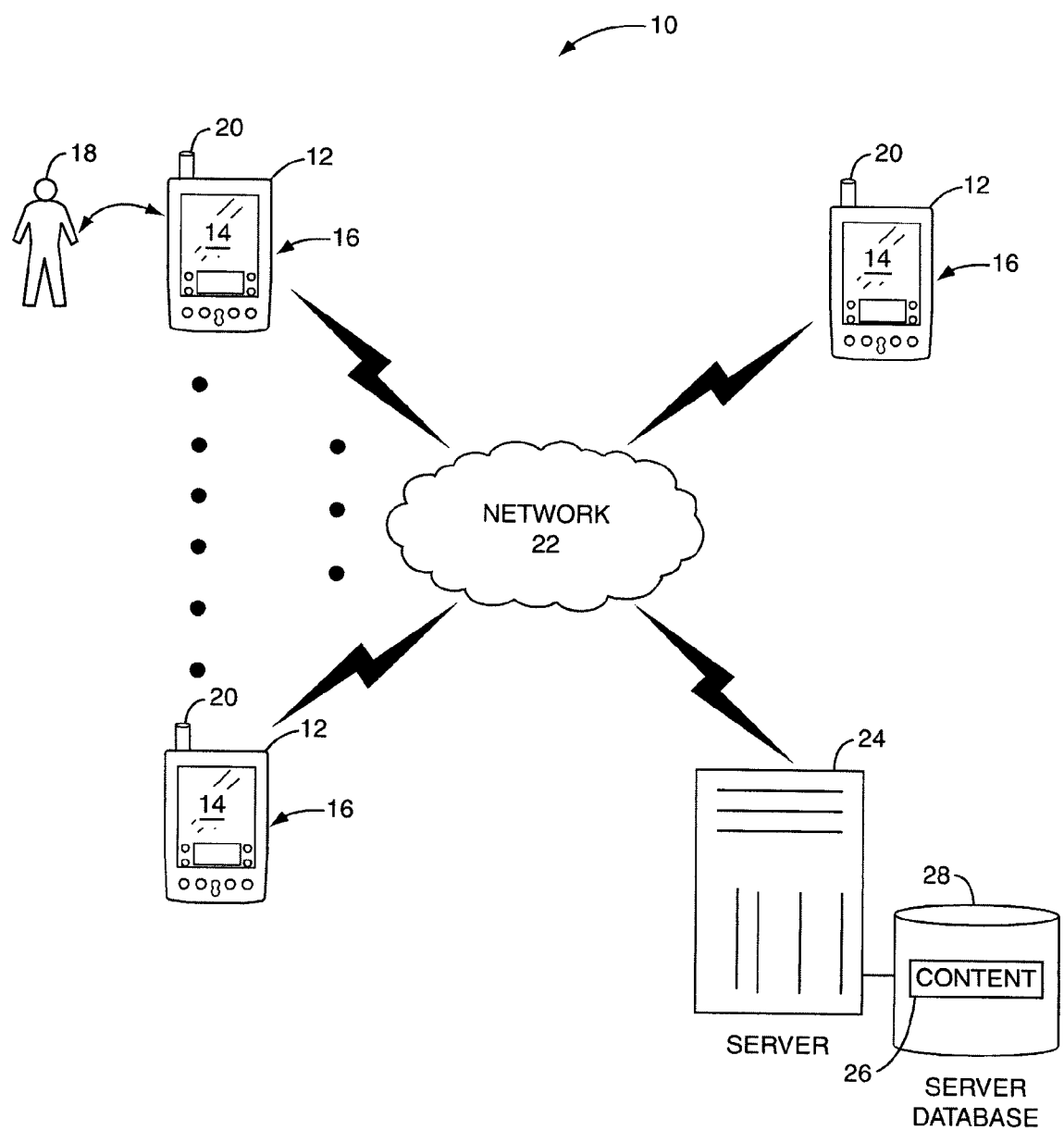
FIG. 1 illustrates an exemplary mobile device system and network architecture according to one embodiment of the present invention.

FIG. 1 illustrates an exemplary system and network architecture 10 for mobile devices that may employ a contextual filtering system and method according to embodiments of the present invention. The mobile device architecture 10 in FIG. 1 will be described in conjunction with FIG. 2, which is a flowchart illustrating an exemplary contextual filtering process. The contextual filtering process involves contextually tagging content with contextual tags. The mobile device filters content based on whether the current context of the mobile device satisfies the contextual behavior of the contextual tag associated with the content. As illustrated in FIG. 1, an exemplary platform for a mobile device 12 is provided. The mobile device 12 includes an output device 14, such as a display, and an input device 16, such as input keys, to allow a user 18 to control, interact, and be presented content on the mobile device 12. The mobile device 12 may include a cellular handset with an accompanying cellular antenna 20 for cellular communications. However, the mobile device 12 can be any type of device adapted to store and manage digital content, including but not limited to a personal data assistant (PDA), a personal media player (PMP), or other handheld device. The mobile device 12 can include multimedia related functionality, including searching, organizing, browsing, previewing, rendering, and/or sharing/transferring content. In one embodiment of the present invention, one or more mobile devices 12 may be included that participate in a wirelessly-connected network 22. However, it should be understood that the present invention does not require the mobile device 12 to be networked. Further, the mobile device 12 may be connected to a wired network.

Figure 2:
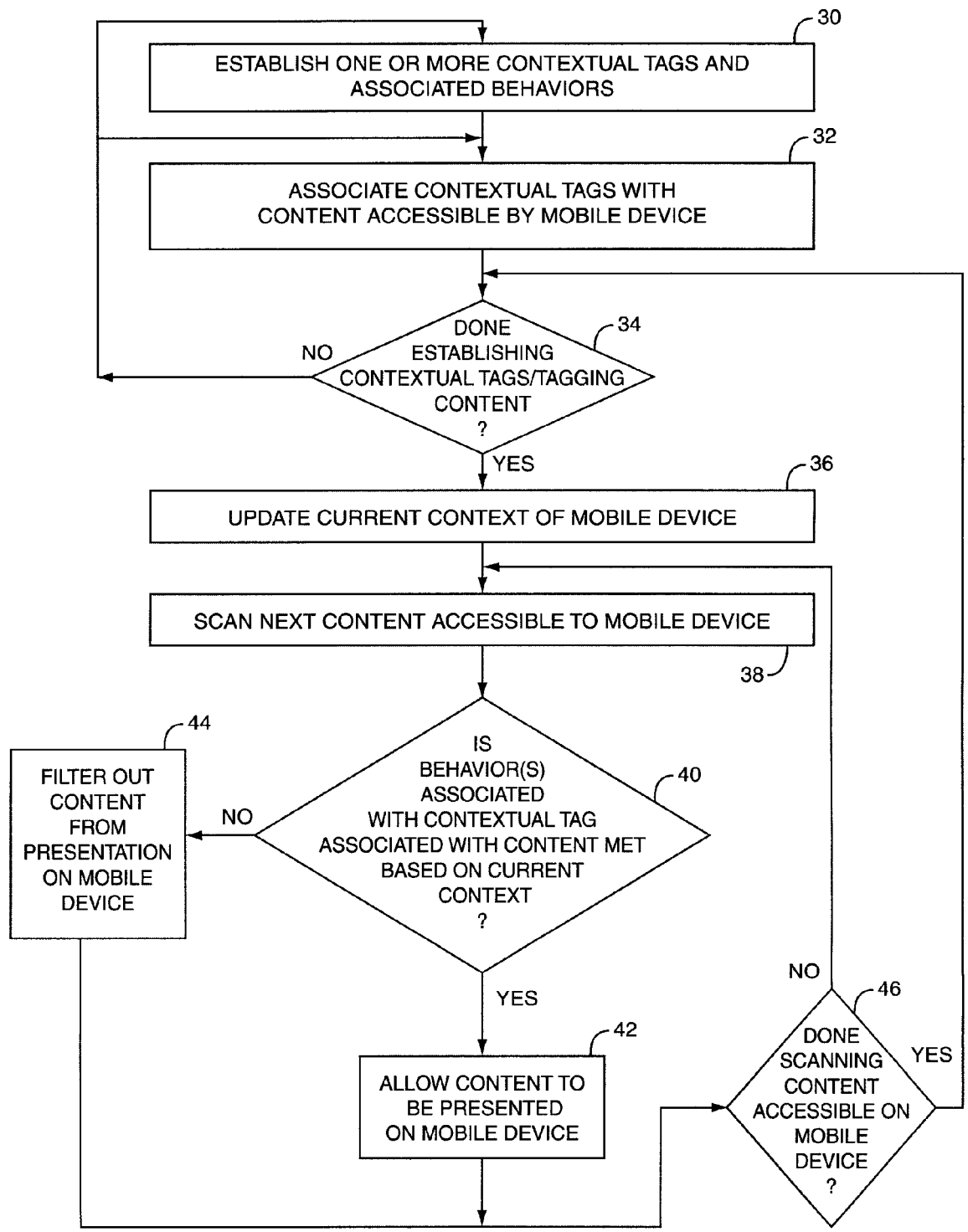
FIG. 2 is a flowchart illustrating an exemplary overall process of establishing contextual tags and filtering content based on whether the current context of the mobile device satisfies the contextual behavior of contextual tags associated with the content, according to one embodiment of the present invention.

Before any content can be tagged, the user 18 first establishes one or more contextual tags (step 30, FIG. 2). Because contextual tags are defined by contextual behaviors, the user 18 associates one or more contextual behaviors with the contextual tags (step 30). A contextual behavior may be a logical expression that can be determined as either being satisfied or not based on the current context of the mobile device 12. An initial context or state may also be associated with the contextual tag. The initial context may be used as part of the contextual behavioral expression to determine if the current context of the mobile device 12 satisfies the contextual behavior. For example, if the contextual behavior is location-based, the desired location in order for the behavior to be satisfied is stored as an initial context or location. The initial location (i.e. initial context) may be a hard coded location that is not programmable by the user 18. For example, the initial location may be a known place or location. Alternatively, the initial location (i.e. initial context) may be programmable. The initial location may be directly set by the user 18, or directed by the user 18 to be set by the context sensed by the mobile device 12 when the contextual tag is created. In any of these cases, this allows the mobile device 12 during operation to compare the current location (i.e. current context) of the mobile device 12 to the initial location (i.e. initial context) stored within the location-based contextual behavior associated with the contextual tag to determine if the location-based contextual behavior is satisfied.

The user 18 next associates or tags content with established contextual tags (step 32). This content may be stored locally on the mobile device 12, or the content may be accessible over the network 22 from a remote service provider. The remote service provider may include a content server 24 that provides content 26 from a server database 28 made accessible over the network 22. The content 26 in the server database 28 may be downloaded to the mobile device 12. Alternatively, the mobile device 12 may stream content 26 in lieu of a permanent download. In any case, the user 18 does not have to associate a contextual tag with all content accessible to the mobile device 12. However, the mobile device 12 may filter out content that is not tagged with a contextual tag. This is because untagged content will not be associated with a contextual behavior that can be satisfied. Alternatively, the mobile device 12 can be configured to present any content to the user 18 that is not contextually tagged.

The user 18 continues establishing contextual tags and/or contextually tagging content until satisfied that all desired content is contextually tagged with the desired behaviors (decision 34). Once the user 18 has finished the desired contextual tagging of content, the mobile device 12 can perform contextual filtering. The mobile device 12 can first update the current context to store the most current context of the mobile device 12 before filtering begins (step 36). The current context can be based on sensing environmental or surrounding conditions of the mobile device 12, or can be based on sensing internal conditions of the mobile device 12, such as the operation of an application or the user's 18 interaction with the mobile device 12, including its applications. The mobile device 12 can next scan contextually tagged content accessible to the mobile device 12 (step 38). If content has been contextually tagged, the mobile device 12 determines if the contextual behavior associated with the contextual tag for the content is satisfied (decision 40). If so, the mobile device 12 allows the content to be presented to the user 18 (step 42). If not, the mobile device 12 filters out the content from presentation to the user 18 since the contextual behavior associated with its contextual tag is not presently satisfied (step 44). For content that is not contextually tagged and thus has no associated contextual behavior, the mobile device 12 can be configured to either automatically filter untagged content out (step 44) or present untagged content to the user 18 (step 42).

The mobile device 12 next determines if all the content accessible to the mobile device 12 has been scanned (decision 46). If not, the mobile device 12 repeats the filtering process in steps 38-44 (FIG. 2) based on the current context, until all contextually tagged content has been scanned and its contextual behavior analyzed. Once all contextually tagged content has been scanned and analyzed, the mobile device 12 allows the user to either change, establish, and/or associate contextual tags with content (steps 30, 32). The mobile device 12 thereafter updates the current context (step 36) and continues with the filtering process (steps 38-46) in a repeating fashion. In this manner, the mobile device 12 automatically and dynamically contextually filters content based on the current context of the mobile device 12.

Figure 3B:
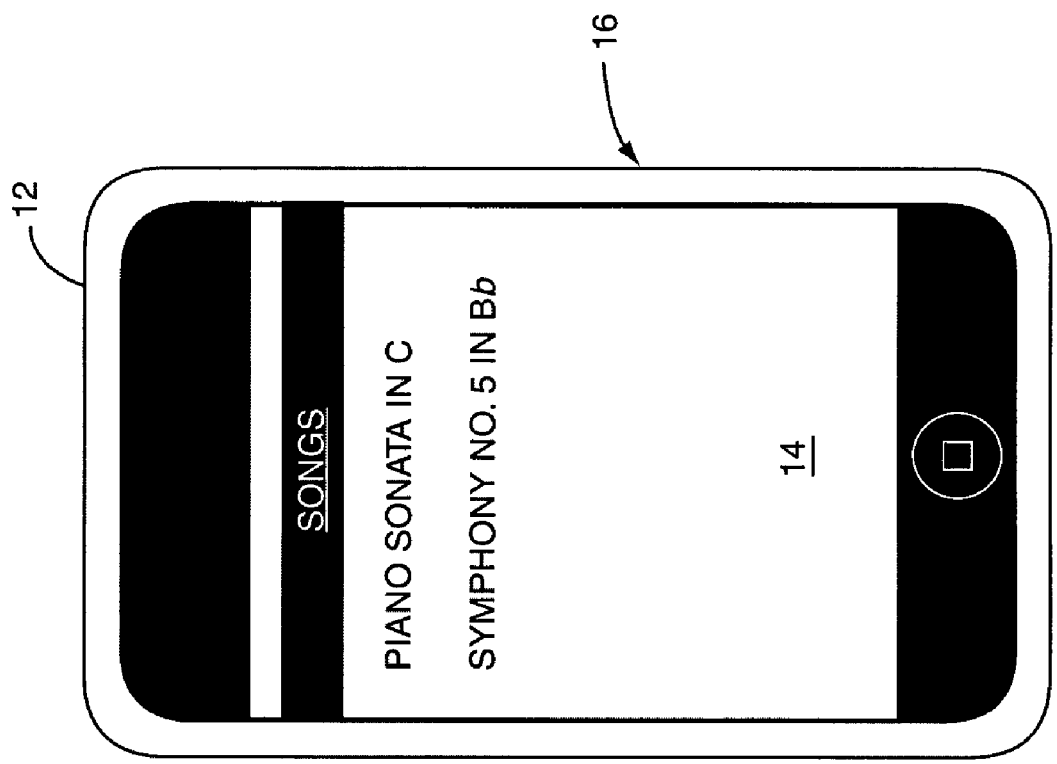
FIG. 3B illustrates an exemplary song file listing displayed on a mobile device after contextual filtering is activated and applied to the song listing illustrated in FIG. 3A, according to an embodiment of the present invention.
Figure 3A:
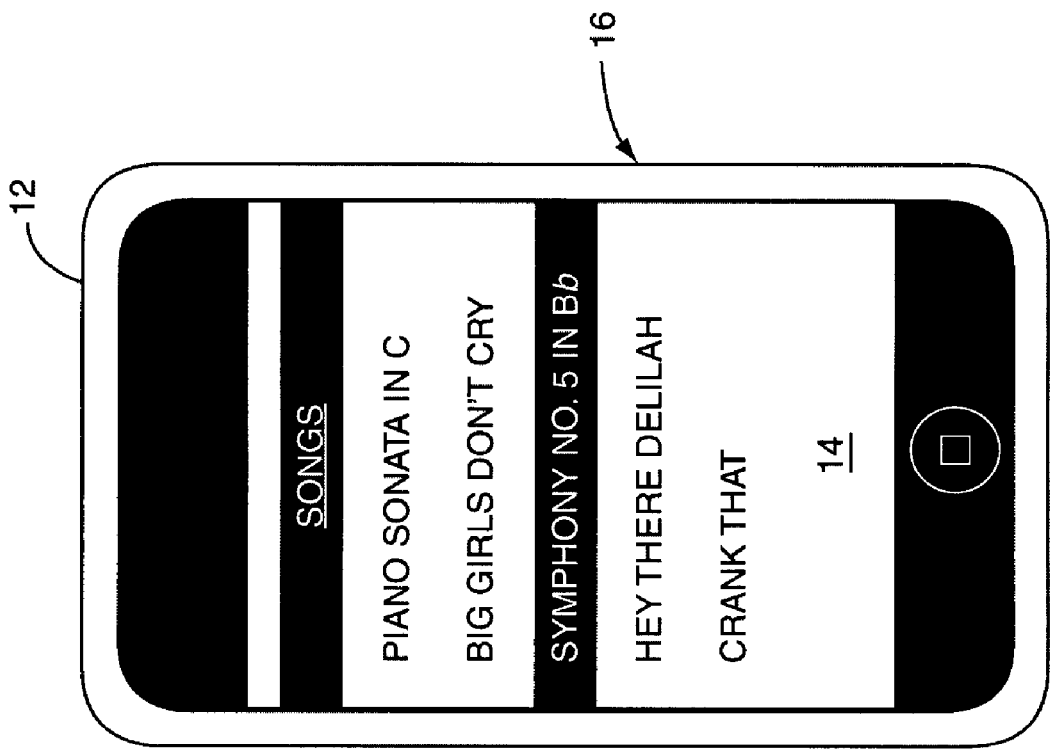
FIG. 3A illustrates an exemplary song file listing displayed on a mobile device before contextual filtering is activated, according to an embodiment of the present invention.

To further illustrate the contextual filtering process and method discussed in FIGS. 1 and 2 and according to embodiments of the present invention, FIGS. 3A and 3B are provided. FIGS. 3A and 3B illustrate an example of a content listing on a mobile device 12 before and after contextual filtering is performed. FIG. 3A illustrates an exemplary mobile device 12 in the form of a media player displaying a song file listing before any contextual filtering is performed. Two classical genre selections are included among other pop genre song listings. Assuming the user 18 has associated a work location contextual tag to only the classical songs, and assuming the mobile device 12 determines, based on the current context, that the mobile device 12 is located at work, the contextual filtering of the present invention will only present the classical selections to the user 18 when at work. The mobile device 12 uses the current context (i.e. a location) to determine that the contextual behavior associated with the classical songs is satisfied. In this regard, FIG. 3B illustrates the same song listing on the mobile device 12 in FIG. 3A, but after contextual filtering is activated. Note that only the classical songs are listed on the display 14.

As discussed above, the mobile device 12 determines its current context to perform contextual filtering of content tagged with contextual tags according to embodiments of the present invention. The context of the mobile device 12 may be based on external conditions or surroundings, or internal conditions of the mobile device 12. For example, the current context may be based on an application executing internally on the mobile device 12 or the user's 18 interaction with the mobile device 12 and/or this application. The current context may also be based on external conditions or surroundings of the mobile device 12. In this case, the mobile device 12 may be equipped with one or more context sensors and/or other sensing devices that allow the mobile device 12 to determine its surroundings or environment. For example, if a contextual behavior associated with a particular contextual tag is location-based, the mobile device 12 needs to be able to determine its current location. The current location is used to analyze whether contextual tags having location-based behaviors are satisfied. In this regard, an exemplary mobile device 12 architecture is illustrated in FIG. 4 and discussed below.

Figure 4:
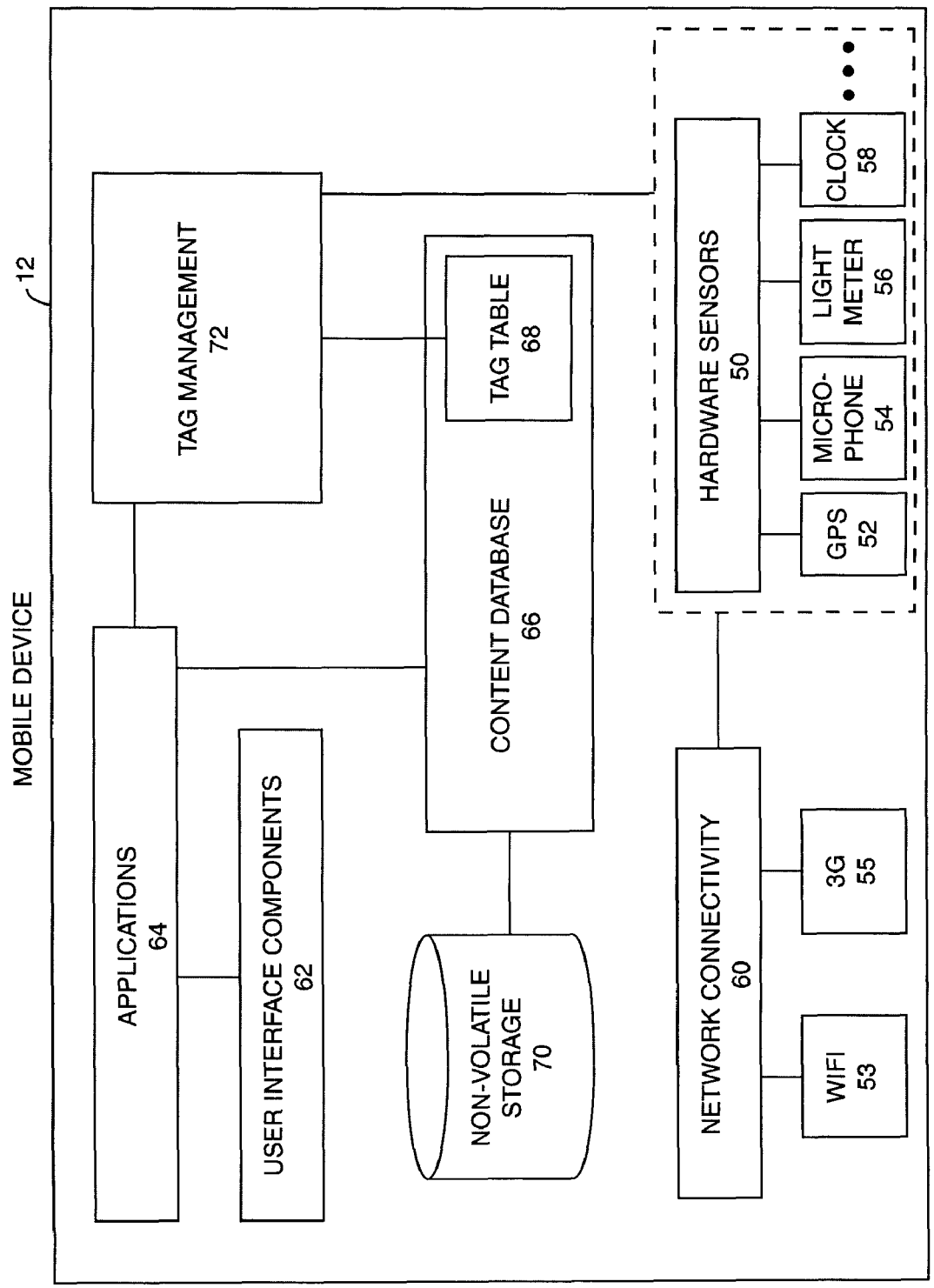
FIG. 4 illustrates an exemplary mobile device architecture that may be employed to allow the mobile device to be "contextually aware" and filter contextually tagged content based on the context of the mobile device, according to one embodiment of the present invention.

As illustrated in FIG. 4, an internal architecture of an exemplary mobile device 12 is shown. The mobile device 12 can be microprocessor-based and include a number of components, including but not limited to a control system(s) to control the operation of the mobile device 12. In order to sense current context, one or more context sensors may be provided in the form of one or more hardware sensors 50. These sensors 50 provide intrinsic support for generating context information to be used in determining if contextual behaviors associated with contextual tags are satisfied. These contextual sensors 50 can include global positioning system (GPS) sensors 52 to determine current location of the mobile device 12 in the event that any contextual behaviors are location based. Alternatively or in addition, the GPS sensors 52 may be used to determine speed, acceleration, and/or direction of travel behaviors of the mobile device 12. A WiFi access point 53 may be included and used in combination with GPS sensors 52 to determine location of the mobile device 12 using triangulation. The mobile device 12 may also use available resources via communications to other users and their devices in proximity to the mobile device 12, including near field communications (NFC) for example, to determine current context, including location.

A microphone 54 is another example of a contextual hardware sensor 50 that may be provided to determine noise level surrounding the mobile device 12. This may include ambient noise. Yet another example of a contextual hardware sensor 50 is a light meter 56. The mobile device 12 may include a light meter 56 to detect the surrounding light condition as part of detecting the current context. The contextual hardware sensors 50 can be any device or component that can sense a condition, surrounding, or behavior regarding the mobile device 12.

If a more precise determination of time is desired other than the presence or lack of light, a clock 58 may be provided. The clock 58 may be provided in lieu or in addition to the light meter 56. The clock 58 enables the mobile device 12 to determine the current time of day as contextual information that may be used to evaluate contextual behavior. The clock 58 may be updated using network communications via a network connectivity component 60 as is common in cellular phones. The network connectivity component 60 also allows the mobile device 12 to maintain a connection with server systems that might further aid in determining the mobile device's 12 current context. The network connectivity component 60 may also be used for downloading and/or otherwise transferring media content to and from the mobile device 12, including but not limited to the content server 24 (see FIG. 1).

User interface components 62 may also be provided to allow the user 18 to interact with the mobile device 12. The user interface components 62 may include input devices, such as a keyboard, touch screen, or other buttons to allow the user 18 to provide input, including establishing and contextually tagging content. The user interface components 62 may also include output devices, such as a display, microphone, and/or a speaker for speech and sound output, to provide content to the user 18 in human-readable form. A software application(s) 64 may be included to drive the overall functionality of the mobile device 12, including operations based on receiving input from the user 18 and providing output to the user 18, via the user interface components 62.

A content database 66 may be provided to store content (including multimedia content) accessible to the mobile device 12. The software application 64 accesses the content database 66 to retrieve information regarding content available on the mobile device 12. The software application 64 provides this information to the user 18 via the output devices in the user interface components 62. The user 18 can then select particular content available in the content database 66 via input devices in the user interface components 62.

The content database 66 may also contain a tag table 68 to store contextual tags created by the user 18. The tag table 68 is also adapted to store the associations between the contextual tags and the content accessible by the mobile device 12 as part of the contextual tagging aspects of the present invention. The tag table 68 is consulted to determine if a contextual tag associated with content has contextual behavior that is satisfied based on the current context of the mobile device 12 as part of the contextual filtering of the present invention. One embodiment of the tag table 68 could include an instance of a contextual tag having a foreign key of the content item. The foreign key could be used as a primary key to access content from a table of content items stored in the content database 66.

Non-volatile memory (NVM) 70 can also be provided in the mobile device 12. The NVM 70 may be used to store content in the content database 66 as well as the contextual tags and their associations with content in the tag table 68 persistently across power cycles of the mobile device 12. When the mobile device 12 is powered on, the content and the contextual tags could be moved from NVM 70 to volatile storage in the content database 66 and tag table 68, including but not limited to cache memory. The NVM 70 could be solid state (NVRAM) or magnetic media (HDD), as examples.

A tag management component 72 may also be provided in the mobile device 12 to facilitate contextual tag management. Particularly, the tag management component 72 may facilitate the creation, editing, deleting, accessing, and managing of contextual tags. The tag management component 72 facilitates access to contextual tags in the tag table 68 to determine if their associated contextual behaviors are satisfied by the current context of the mobile device 12 as part of the contextual filtering provided by the present invention. The tag management component 72 also facilitates creation of contextual tags in response to user 18 requests provided via the application software 64. The tag management component 72 also facilitates user 18 requests to set up and associate one or more contextual behaviors with contextual tags. The tag management component 72 can also facilitate storing the user's 18 requests to tag content with particular contextual tags in the tag table 68 for use in contextual filtering.

Figure 5:
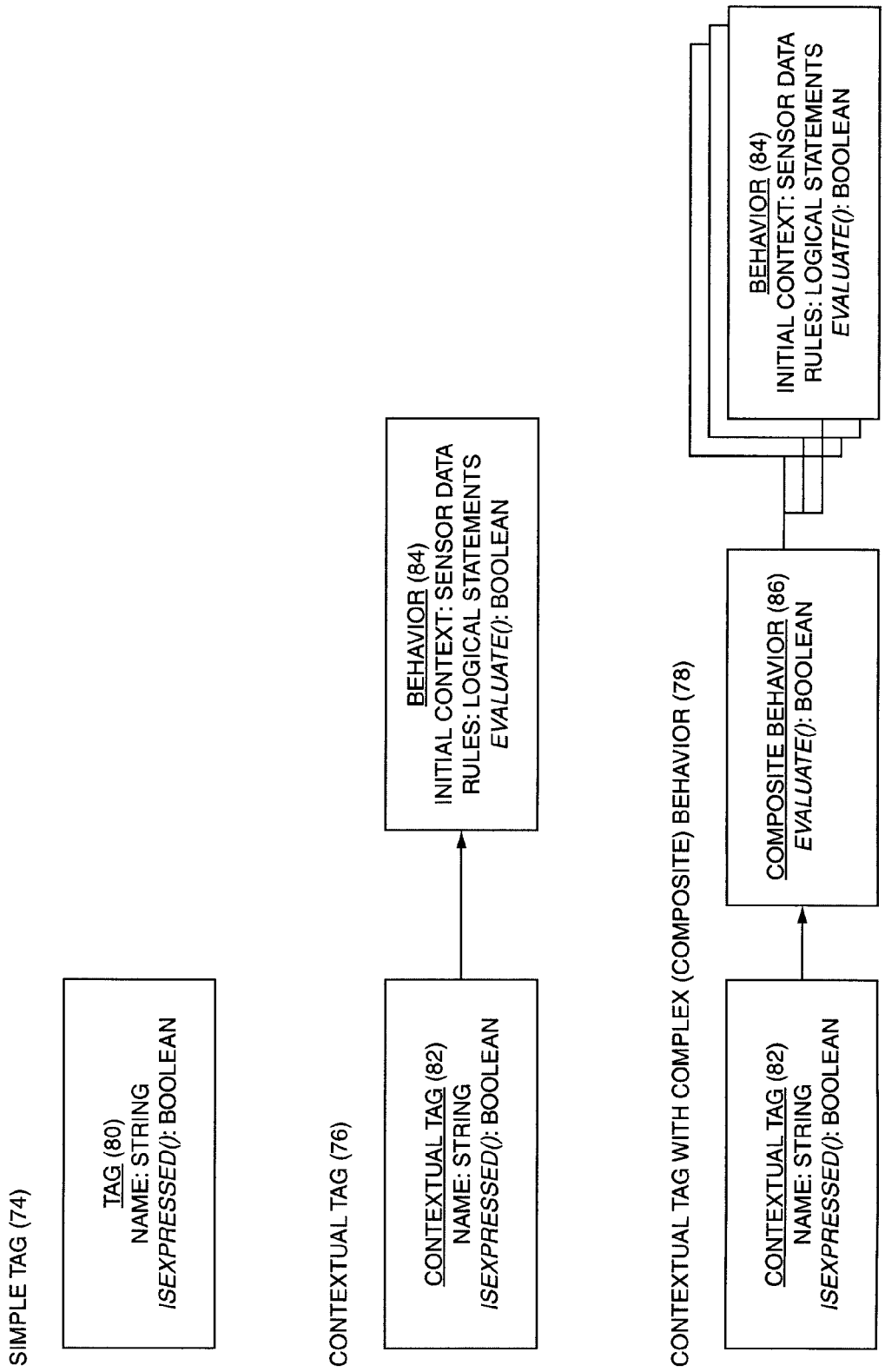
FIG. 5 illustrates an exemplary tag management architecture and exemplary tags created using the tag management architecture.

In one embodiment of the present invention, object-oriented design (OOD) principles are employed in the tag management component 72 to create contextual tags and associate contextual behaviors with the contextual tags. OOD may be particularly well suited for this function since OOD defines methods and attributes so as to associate behavior with data. FIG. 5 illustrates examples of three kinds of tags that could be created by the tag management component 72 and stored in the tag table 68. These are a simple tag 74, a contextual tag 76, and a contextual tag with complex or composite behavior 78. A simple tag 74 is a static-based tag that does not have a true contextual behavior. The contextual tags 76, 78 include a contextual behavior based on the current context of the mobile device 12. In this example, these tags 74, 76, 78 are created in the form of tag objects 80, 82 implemented using object-oriented (OO) techniques. These tags 74, 76, 78 are expressed in the tag table 68 as tag objects 80, 82. Any one of these tags may be associated with content in the mobile device 12 as part of a filtering process. The present invention involves the use of contextual tags 76, 78 in particular as a method of contextually filtering content presented by the mobile device 12. However, the present invention does not exclude the additional use of simple tags 74 being associated with content as part of the filtering process performed by the mobile device 12 as well.

If the user 18 directs the mobile device 12 to create a simple tag 74, a call may be made to a tag factory in the tag management component 72 [e.g. createSimpleTag(name: string): void]. In response, the simple tag 74 is created in the form of a simple tag object 80 according to this OOD embodiment. As illustrated in FIG. 5, the simple tag object 80 includes a name attribute in the form of a string to identify the tag. A simple tag 74 is not based on behavior and thus is not expressed based on the current context of the mobile device 12. Content tagged with a simple tag 74 can only be filtered based on a static-based filtering criteria either matching or not matching the name of the simple tag object 80. For example, a simple tag 74 for audio content may be "Rock" genre. If the user 18 selects "Rock" genre to be selected, content tagged with the "Rock" genre tag will be made available to the user 18.

If the user 18 directs the mobile device 12 to create a contextual tag 76, as opposed to a simple tag 74, a call may be made to a tag factory in the tag management component 72. In response, a contextual tag object 82 may be created from a tag class according to this OOD embodiment as illustrated in FIG. 5. The user 18 may choose to create a contextual tag 76 assigned with built-in behaviors [e.g. createBuiltinTag(type: String, name: string): void], or "user-defined" behaviors [e.g. createUserTag(name: string, behavior: Behavior):void]. A "built-in" contextual tag is a contextual tag that is assigned a behavior, via a Behavior object 84, whose rules already defined and stored in the tag management component 72. For example, the mobile device 12 manufacturer may have created these built-in behaviors during manufacture of the mobile device 12. These built-in behaviors may be based on the particular hardware or software configuration of the mobile device 12. These behaviors have fixed rules and are registered with the tag factory in the tag management component 72 when the mobile device 12 is powered on. The user 18 can control the context that must be satisfied (i.e. initial context) by selecting which built-in behavior types are associated with a contextual tag 76. For example, a built-in contextual tag may have a "weekend" behavior such that content tagged with the "weekend" contextual tag will be made available to the user 18 only on weekend days.

Alternatively, the user 18 can direct the mobile device 12 to create a "user-defined" contextual tag. A "user-defined" contextual tag is a contextual tag 76 assigned with user-defined behaviors. The user controls the context in which content is to be presented by the mobile device 12 by defining the desired behavior. The tag factory in the tag management component 72 may be called upon to create a "user-defined" contextual tag. A contextual tag object 82 is created in response. However, unlike "built-in" contextual tags, a user 18 can define and assign user-defined behaviors with a "user-defined" contextual tag according to the mobile device 12 application state and rules, allowing open-ended functionality.

In either the case of a "built-in" or "user-defined" contextual tag, a Behavior object 84 is associated with the contextual tag object 82 and called upon to determine if the assigned behavior is satisfied based on the current context of the mobile device 12. The Behavior object 84 contains a "user-defined" behavior for "user" contextual tags as opposed to a "built-in" behavior for "built-in" contextual tags. The behaviors are expressed by logical statements that are evaluated based on the current context of the mobile device 12. The Behavior object 84 can also contain an initial context attribute if the behavior logical expression is based on a relationship between the current context of the mobile device 12 and an initial context when the contextual tag was created. For example, if the contextual tag is location-based, the logical expression in the Behavior object 84 may be based on whether the current context location of the mobile device 12 (i.e. a current context) is within a certain distance of the initial location (i.e. initial context). In this manner, the user 18 can associate the behavior to be satisfied based on the context of the mobile device 12 when the content was first tagged. For example, if the user 18 tags content with a work location contextual tag when the user 18 is at work, the work location will be stored in the initial context using the contextual sensor 50 to determine the desired location automatically for the user 18. The mobile device 12 can subsequently determine if the work contextual tag behavior is satisfied based on a comparison of the current context location with the location stored in the initial context when the contextual tag was created.

Additionally, the present invention also allows a user 18 to create a composite contextual tag 78. A composite contextual tag 78 is one which includes multiple contextual behaviors that must be satisfied. A composite contextual tag 78 is created in the OOD embodiment illustrated in FIG. 5 similar to a contextual tag 76. A contextual tag object 82 is created just as before. However, the contextual tag object 82 inherits a Composite Behavior object 86, which allows a simple Boolean operation to be applied to multiple Behavior objects 84. These multiple Behavior objects 84 can include both "user-defined" and "built-in" behaviors. For example, the composite behavior could be comprised of two (2) miles within a coffee shop, and in the evening or in the morning. Thus, content tagged with this composite contextual tag will be made available if the time is morning or evening, and the mobile device 12 is located within two (2) miles of a coffee shop.

Figure 6:
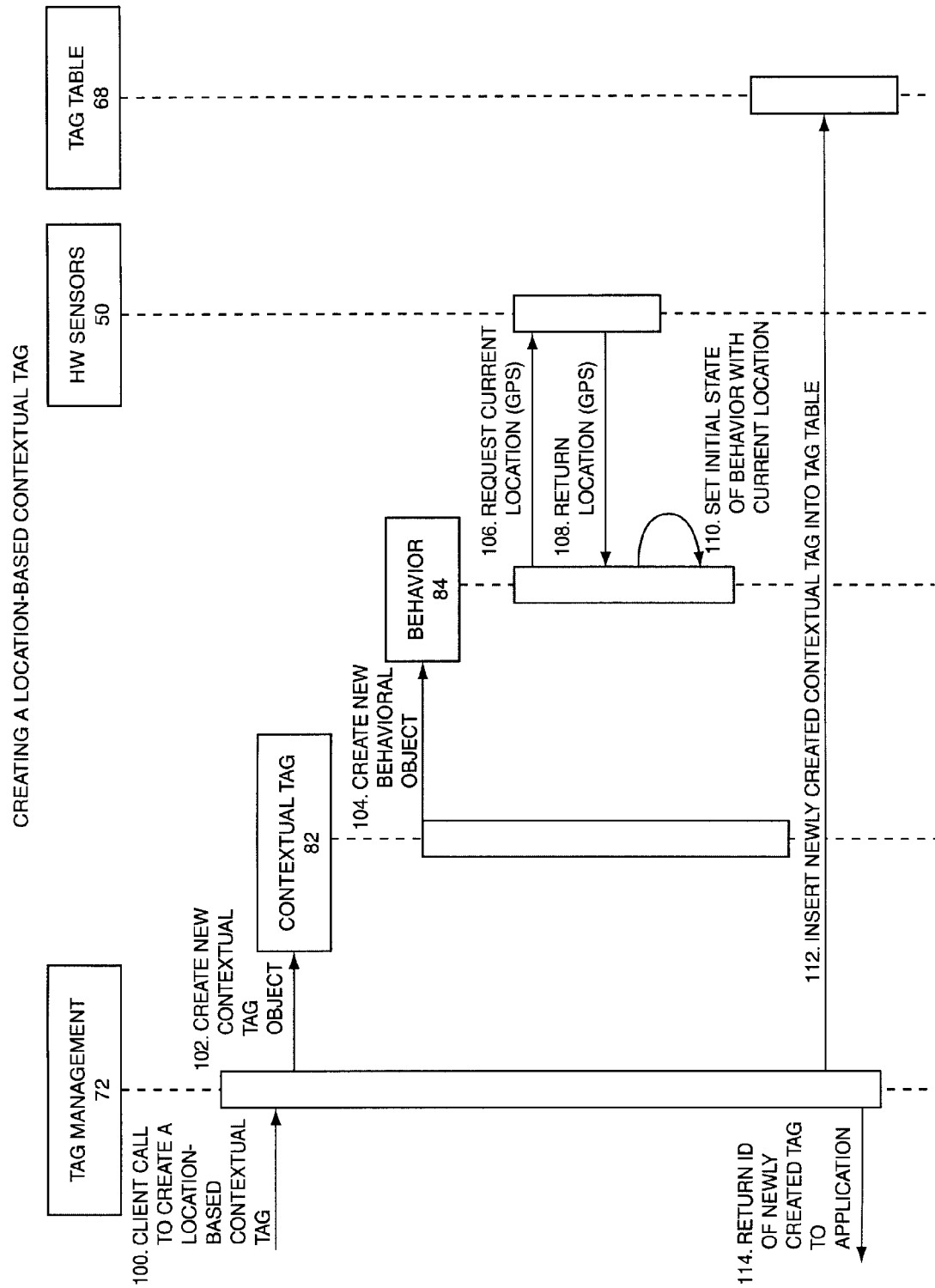
FIG. 6 is a flow diagram illustrating an example of creating a location-based contextual tag for filtering content based on the mobile device's location, according to one embodiment of the present invention.

To further illustrate how contextual tags can be created according to embodiments of the present invention, FIG. 6 illustrates a flow diagram that provides an example of creating a "user-defined" location-based contextual tag. This example is consistent with the OOD examples of contextual tags previously discussed in FIG. 5. As illustrated in FIG. 6, the process begins with a client call to create a location-based contextual tag to the tag management component 72 (step 100). In response, the tag management component creates a new contextual tag object 82 (step 102). A new Behavior object 84 is created for the new contextual tag object 82 (step 104). Because the contextual tag is defined as a location-based contextual tag, the Behavior object 84 requests the current location of the mobile device 12 by consulting the hardware sensors 50, namely the GPS 52 (step 106). The current location is returned (step 108) so that the initial location (context) of the Behavior object 84 can be set with the returned current location (step 110). The initial location (context) is representative of the location that must be satisfied by the Behavior object 84 when performing the contextual filtering process. Thus, when the mobile device 12 later during operation comes back into the same area as the initial location, the Behavior object 84 will be satisfied, indicative of the mobile device 12 being currently located in an area where the Behavior object 84 was first created. Thus, the location-based behavior will be satisfied. The content tagged with this location-based contextual tag will be made available to the user 18.

After the contextual tag object 82 and its Behavior object 84 (including defining in the initial context with the current location of the mobile device 12) is created, the newly created contextual tag is stored in the tag table 68 (step 112). An identification (ID) of the contextual tag is returned to the calling application to identify the contextual tag (step 114). The contextual tag, via the ID, can then be used to tag content with the location-based behavior of the contextual tag as desired.

Contextual tagging can be performed either explicitly or implicitly. Content can be contextually tagged explicitly as a result of the user 18 making an explicit request to the mobile device 12 via the user interface 62. Alternatively, the mobile device 12 may be directed to implicitly contextually tag content without the user 18 explicitly directing or controlling the contextual tagging of content. This allows the user 18 to later recall content based on selecting from previous contexts in which the user 18 browsed and/or accessed content on the mobile device 12. For example, as a user 18 accesses content in a normal fashion, the mobile device 12 may automatically and silently contextually tag content accessed by the user 18. If the user 18 desires to later recall specific content, but the user 18 can only remember the context in which the content was previously accessed, the user 18 can review and select contextual tags assigned by the mobile device 12 to recall content. This allows the user 18 to recall and access content by context as opposed to having to recall the identification of the content itself.

Figure 7:
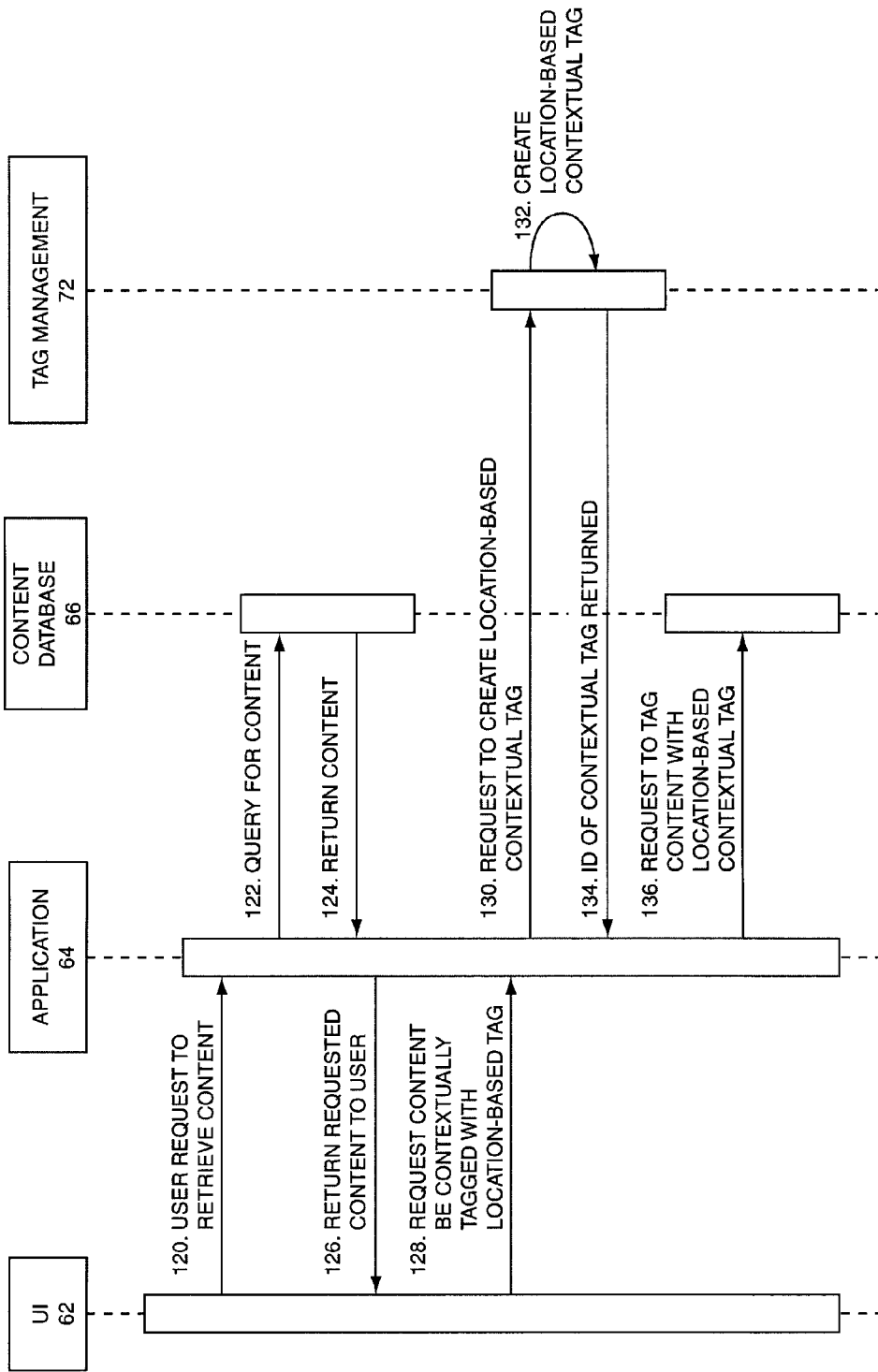
FIG. 7 is a flow diagram illustrating an example of a user explicitly creating a location-based contextual tag for content, according to one embodiment of the present invention.

In this regard, FIGS. 7 and 8 illustrate flow diagrams that show by example how a location-based contextual tag may be created explicitly or implicitly. FIG. 7 illustrates an example of the user 18 explicitly creating a location-based contextual tag for content. FIG. 8 illustrates an example of the mobile device 12 implicitly creating a location-based contextual tag for content.

Turning to FIG. 7, the user 18 directs the user interface 62 to request particular content. In response, the user interface 62 sends the request to the application software 64 executing on the mobile device 12 (step 120). The application software 64 sends a query for the content specified by the user 18 to the content database 66 (step 122). The content is then returned to the application software 64 (step 124), and from the application software 64 to the user 18 via the user interface 62 (step 126). The user 18 may then decide to contextually tag the retrieved content. If so, a request is sent from the user interface component 62 to the application software 64 to contextually tag the content with a location-based contextual tag (step 128). In response, the application software 64 sends a request to the tag management component 72 to create a location-based contextual tag based on the mobile device's 12 current location (step 130). The tag management component 72 creates the location-based contextual tag (step 132). This process can involve the steps provided in the flow diagram of FIG. 6 for example. After the location-based contextual tag is created, the ID of the contextual tag is returned to the application software (step 134). The application software 64 then in turn requests the content database 66 tag the content with the newly created location-based contextual tag in the tag table 68. In this manner, the content is now contextually tagged with a contextual behavior based on the current location of the mobile device 12.

FIG. 8 illustrates the mobile device 12 implicitly contextually tagging content. This feature may be particularly useful to allow a user 18 to recall previously accessed context where the user 18 may only remember the context in which the content was previously accessed. The user 18 can review a listing of contextual tags as opposed to content listings to recall content accessed in the remembered content. The process begins by the user 18 requesting specific content via the user interface component 62. The user interface component 62 passes the user's 18 request to the application software 64 (step 140). The application software 64 sends a query for the content specified by the user 18 to the content database 66 (step 142). The content is then returned to the application software 64 (step 144). The application software 64 then begins playback of the requested content (step 146). In the background and unknown to the user 18, the application software 64 also requests creation of a location-based contextual tag to the tag management component 72 (step 148). The tag management component 72 creates the location-based contextual tag (step 150). This process can involve the steps provided in the flow diagram of FIG. 6 for example. The tag management component 72 then returns the ID for the contextual tag to the application software (step 152). The application software 64 (as opposed to the user 18) requests the content database 66 to contextually tag the content being played back with the newly created location-based contextual tag (step 154). Thus, if the user 18 cannot remember the content, but can remember the context of the mobile device 12 in which it was accessed (which in this example is the location), the user 18 can browse content based on contextual tags previously established. The user 18 may then be able to easily remember and identify the desired content.

As discussed above in the flow diagram examples of creating contextual tags in FIGS. 6 through 8, after the tag management component 72 is used to create tags (including simple and contextual tags 74, 76, 78), these tags and their associated behaviors and associations with content can be stored in the tag table 68. The tag table 68 is consulted by the mobile device 12 during operation to determine whether contextual behaviors associated with contextual tags are satisfied based on the current context of the mobile device 12. FIGS. 9A and 9B illustrate an exemplary tag table 68 to further illustrate contextual tagging. The tags stored in the tag table 68 are stored in rows. A tag data type 160 is provided in the far left column to identify the type of tag in the table. The tag type can either be a simple tag ("Tag") or a contextual tag ("Contextual Tag"). All tags have a name 162 in this example, but as previously discussed, only contextual tags have a behavior data type 164 ("Behavior Data Type"). The behavior data type 164 further consists of an initial context state 166 ("Initial State") and the contextual behavior, which is provided in the form of rules 168 ("Rules") or a logical expression. The rules 168 determine whether the contextual behavior is satisfied based on the current context of the mobile device 12. The logical expression can consist of multiple expressions using Boolean relationships. If the rules 168 for a particular contextual tag are not dependent on an initial context state 166, the initial context state 166 may be left blank.

If the contextual tag is of the composite behavior type, more than one behavior expression or object is provided. Thus, one or more "child" behaviors 170, 172, 174 ("Child Behavior") may be provided in the tag table 68. The composite contextual tag has multiple behaviors that must be met based on the current context of the mobile device 12 in order for the composite contextual tag to be satisfied. Only composite contextual tags contain information in the child behavior columns 170, 172, 174. The child behaviors 170, 172, 174 also each contain a behavior data type field, an initial context state, and rules so that whether a child behavior is satisfied based on the current context of the mobile device 12 can be determined. Defining contextual tags in the form of composite contextual tags may be particularly useful if each of the desired behaviors are already defined in the tag management component 72. In this case, rather than defining a new or complex contextual behavior, the user 18 can simply assign multiple and/or existing contextual behaviors to the contextual tag. Thus, in the case of the OOD embodiment example in FIG. 5, contextual behavior objects can be reused to facilitate efficient programming and memory needed to store contextual behavior objects.

After contextual tags have been created and assigned to content by the user 18, the mobile device 12 can perform contextual filtering based on the current context of the mobile device 12. In this embodiment of the present invention, the mobile device 12 contextually filters content based on the current context of the mobile device 12 for both simple and contextual tags 74, 76, 78. Simple tags can simply be defined as having a behavior always being met or true independent of the current context of the mobile device 12. Thus, the mobile device 12 can contextually filter content for all tagged content in the same manner since the behavior for simple tags is hardcoded as always being satisfied. This has the advantage of providing the same operation and algorithms for all tagged content. In this regard, FIGS. 10 and 11 illustrate flow diagrams that provide examples of evaluations of whether a location-based contextual tag is satisfied for content such that it will be presented to the user 18.

FIG. 10 illustrates a flow diagram that provides an example of an evaluation of whether a location-based contextual tag is satisfied for content based on the current location of the mobile device 12. If the current location of the mobile device 12 satisfies the contextual behavior associated with the location-based contextual tag, the content tagged with the location-based contextual tag will be presented to the user 18. The process starts by the application software 64 providing a request to the tag management component 72 to determine if the behavior of a particular location-based contextual tag associated with content is satisfied, meaning it evaluates true (step 180). The tag management component 72 provides a search request to find the specified contextual tag from the tag table 68 (step 182). This is because the contextual tags and their associated behavior are stored in the tag table 68. The tag table 68 returns the contextual tag requested (step 184). The tag management component 72 calls upon the contextual tag object 82 to determine if its behavior is satisfied (step 186). The contextual tag object 82 calls upon its Behavior object 84 in response (step 188). The current context, and in this example the current location, of the mobile device 12 is requested via access to the hardware sensor(s) 50 (step 190). The current location is returned to the Behavior object 84 (step 192), and the behavior expression in the Behavior object 84 is determined as either being satisfied or not (step 194). If satisfied, this means that the mobile device 12 is located in the proper relation to the location stored as the initial location in the contextual behavior of the location-based contextual tag. The result of whether the contextual behavior is satisfied is then sent to the contextual tag object 82 (step 196), which in turn is sent to the tag management component 72 (step 198) and the application software 64 (step 200). The application software 64 can then determine whether to present the tagged content to the user 18 based on whether the contextual behavior associated with the location-based contextual tag is satisfied.

FIG. 11 illustrates a flow diagram that provides an example of an evaluation of whether a location-based contextual tag is satisfied for content based on a hypothetical location of the mobile device 12. This is performed when the user 18 manually forces or overrides the current context of the mobile device 12 even if the forced context does not naturally exist at the time. An override context received from the user 18 may be used in place of a current context of the mobile device (e.g. in step 34 of FIG. 2). If the contextual behavior associated with the contextual tag is satisfied by the hypothetical context, the mobile device 12 presents the content associated with the contextual tag to the user 18. This allows the user 18 to force the mobile device 12 to present content tagged with a contextual tag having a certain contextual behavior even if the mobile device 12 does not have a current context that satisfies the given contextual behavior. For example, the user 18 may desire to be presented with content tagged with a home location contextual tag when the user 18 is on vacation. Although the current context of the mobile device 12 is not home, the user 18 may deem content tagged with this location-based contextual tag to still be appropriate or desired on vacation.

The process starts by the application software 64 requesting and receiving in response, recently used context data from the hardware sensor(s) 50 (steps 210, 212). These optional steps allow the user 18 to be presented with past contextual data to use as the hypothetical location as opposed to the user selecting a location that may have not ever been associated with a contextual tag as the initial context. The application software 64 may then provide a request to the tag management component 72 to determine if a particular location-based contextual tag associated with content is satisfied given the hypothetical location (step 214). The tag management component 72 provides a search request to find the specified contextual tag from the tag table 68 (step 216). This is because the contextual tags and their associated behaviors are stored in the tag table 68. The tag table 68 returns the contextual tag requested (step 218). The tag management component 72 then calls upon the contextual tag object 82 to determine if its behavior is satisfied or not based on the hypothetical location (step 220). The contextual tag object 82 calls upon its Behavior object 84 in response (step 222). The behavior expression in the Behavior object 84 is determined as either being satisfied or not (step 224). Note that unlike the flow diagram example in FIG. 10, a consultation of the hardware sensor(s) 50 is not necessary before this step is performed since a hypothetical location is used in place of one detected by the mobile device 12.

If the Behavior object 84 is satisfied, this means that the hypothetical location satisfies the location stored as the initial context in the location-based contextual tag. The result of whether the behavior is satisfied is then sent to the contextual tag object 82 (step 226), which in turn is sent to the tag management component 72 (step 228) and the application software 64 (step 230). The application software 64 can then determine whether to present the content to the user 18 based on whether the behavior associated with the location-based contextual tag is satisfied.

Those skilled in the art will recognize improvements and modifications to the preferred embodiments of the present invention. All such improvements and modifications are considered within the scope of the concepts disclosed herein and the claims that follow.

What is claimed is:

1. A method of filtering content, comprising the steps of:
   determining a current context of a mobile device;
   determining if a behavior of a contextual tag associated with content accessible to the mobile device is satisfied by the current context; and
   determining if the content is to be presented on the mobile device based on the determining if the behavior is satisfied.

2. The method of claim 1, further comprising presenting the content on the mobile device if the behavior is satisfied.

3. The method of claim 1, further comprising not presenting the content on the mobile device if the behavior is not satisfied.

4. The method of claim 1, wherein the contextual tag is a composite contextual tag;
   wherein the determining if a behavior is satisfied comprises determining if multiple behaviors of the composite contextual tag associated with content accessible to the mobile device is satisfied by the current context; and
   wherein the determining if the content is to be presented on the mobile device comprises determining if the content is to be presented on the mobile device based on the determining if the multiple behaviors are satisfied.

5. The method of claim 1, wherein the determining a current context of a mobile device comprises receiving information from at least one context sensor associated with the mobile device.

6. The method of claim 1, further comprising:
determining if a static condition of a simple tag associated with content accessible to the mobile device is satisfied; and
based on the determining if the static condition is satisfied, determining if the content is to be presented on the mobile device.

7. The method of claim 1, wherein the determining if a behavior is satisfied by the current context comprises determining if a behavior of a contextual tag associated with content accessible to the mobile device is satisfied by the current context based on an initial context of the contextual tag.

8. The method of claim 7, wherein the contextual tag is a location-based contextual tag wherein the initial context is an initial location of the mobile device when the contextual tag was created and the current context is a current location of the mobile device.

9. The method of claim 1, further comprising receiving an explicit request to create the contextual tag prior to the determining if a behavior is satisfied.

10. The method of claim 1, further comprising implicitly creating the contextual tag and associating the contextual tag with the content in response to a user requesting access to the content.

11. The method of claim 10, wherein the contextual tag is a location-based contextual tag and the current context is a current location of the mobile device,
wherein the determining if a behavior is satisfied by the current context comprises determining if a behavior of a contextual tag associated with content accessible to the mobile device is satisfied by the current location based on an initial location of the mobile device when the contextual tag was implicitly created.

12. The method of claim 1, further comprising receiving an override context from a user and replacing the current context with the override context;
wherein the determining if a behavior is satisfied comprises determining if a behavior of a contextual tag associated with content accessible to the mobile device is satisfied by the override context.

13. The method of claim 1, further comprising:
receiving a request to review one or more initial contexts from a plurality of the contextual tags associated with the content accessible by the mobile device;
presenting the one or more initial contexts on the mobile device; and
receiving a selection for the one or more initial contexts on the mobile device; and
presenting content on the mobile device tagged with initial contexts that match the selected one or more initial contexts.

14. The method of claim 1, wherein the contextual tag is expressed as a contextual tag object and wherein the behavior is expressed as a behavior object inherited by the contextual tag object.

15. The method of claim 1, wherein the contextual tag is associated with the content persistently in the mobile device.

16. The method of claim 1, wherein the determining if a behavior is satisfied comprises evaluating whether a logical expression associated with the contextual tag based on the current context is satisfied.

17. A mobile device, comprising:
a control system, comprising a microprocessor that operates to:
determine a current context of a mobile device;
determine if a behavior of a contextual tag associated with content accessible to the mobile device is satisfied by the current context; and
determine if the content is to be presented on the mobile device based on the determining if the behavior is satisfied.

18. The mobile device of claim 17, wherein the control system is further adapted to present the content on the mobile device if the behavior is satisfied.

19. The mobile device of claim 17, wherein the control system is further adapted to not present the content on the mobile device if the behavior is not satisfied.

20. The mobile device of claim 17, wherein the control system is adapted to determine a current context of a mobile device by receiving information from at least one context sensor associated with the mobile device.

21. The mobile device of claim 20, wherein the at least one context sensor is at least one sensor comprised from the group consisting of: a GPS sensor, a light meter, a microphone, a WiFi access point, a 3G receiver, and a clock.

22. The mobile device of claim 17, wherein the control system is adapted to determine if a behavior is satisfied by the current context by determining if a behavior of a contextual tag associated with content accessible to the mobile device is satisfied by the current context based on an initial context of the contextual tag.

23. The mobile device of claim 17, wherein the control system is further adapted to receive an override context from a user and replace the current context with the override context;
wherein the control system determines if a behavior is satisfied by determining if a behavior of a contextual tag associated with content accessible to the mobile device is satisfied by the override context.

24. A computer readable medium embodied in an article of manufacture and storing software adapted to execute on a microprocessor to:
determine a current context of a mobile device;
determine if a behavior of a contextual tag associated with content accessible to the mobile device is satisfied by the current context; and
determine if the content is to be presented on the mobile device based on the determining if the behavior is satisfied.

25. The computer readable medium of claim 24, wherein the software is further adapted to not present the content on the mobile device if the behavior is not satisfied.

* * * * *